INVENTOR
JOSEPH P. WESSON
BY: Featherstonhaugh & Co.
ATTORNEYS

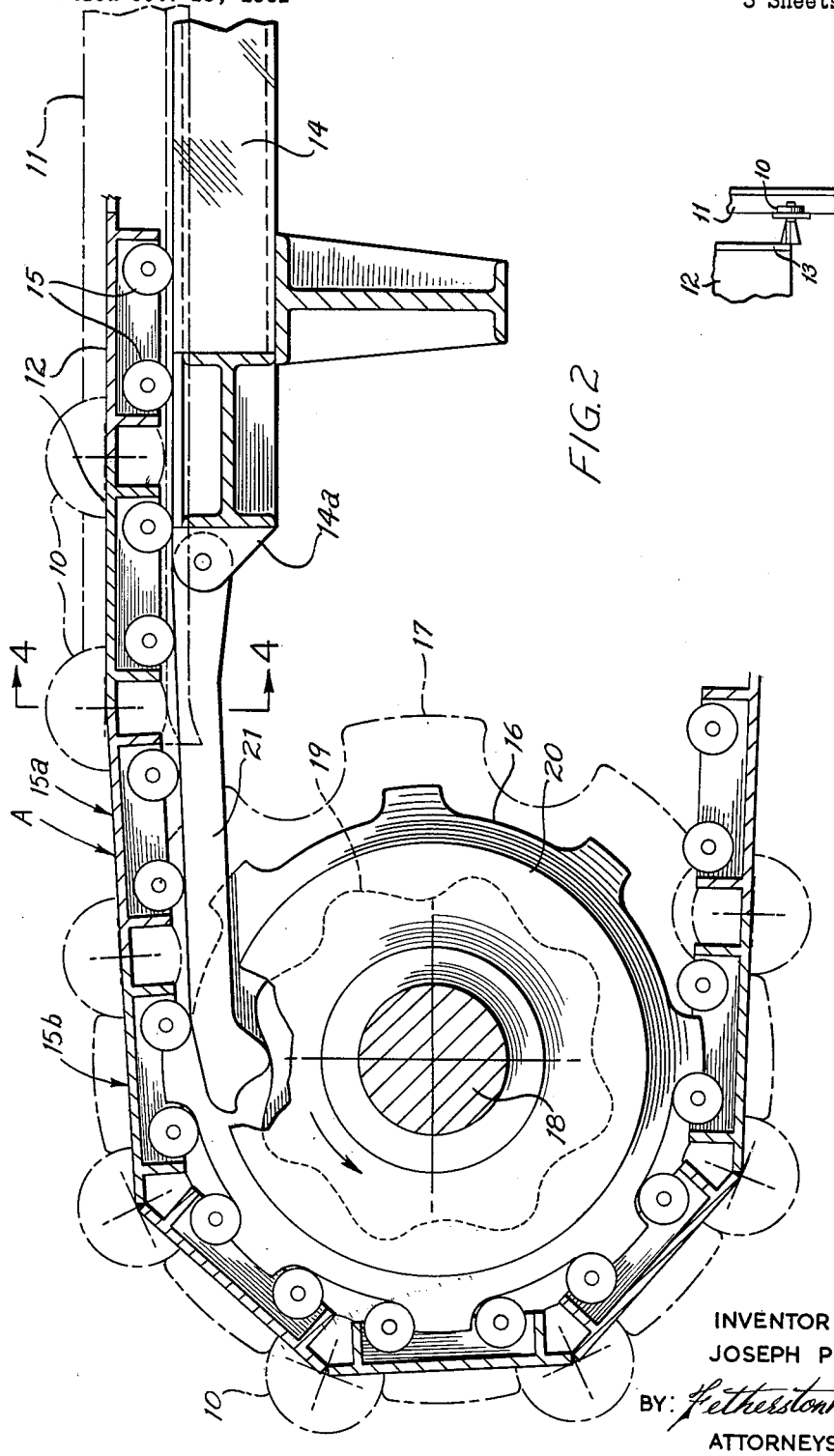

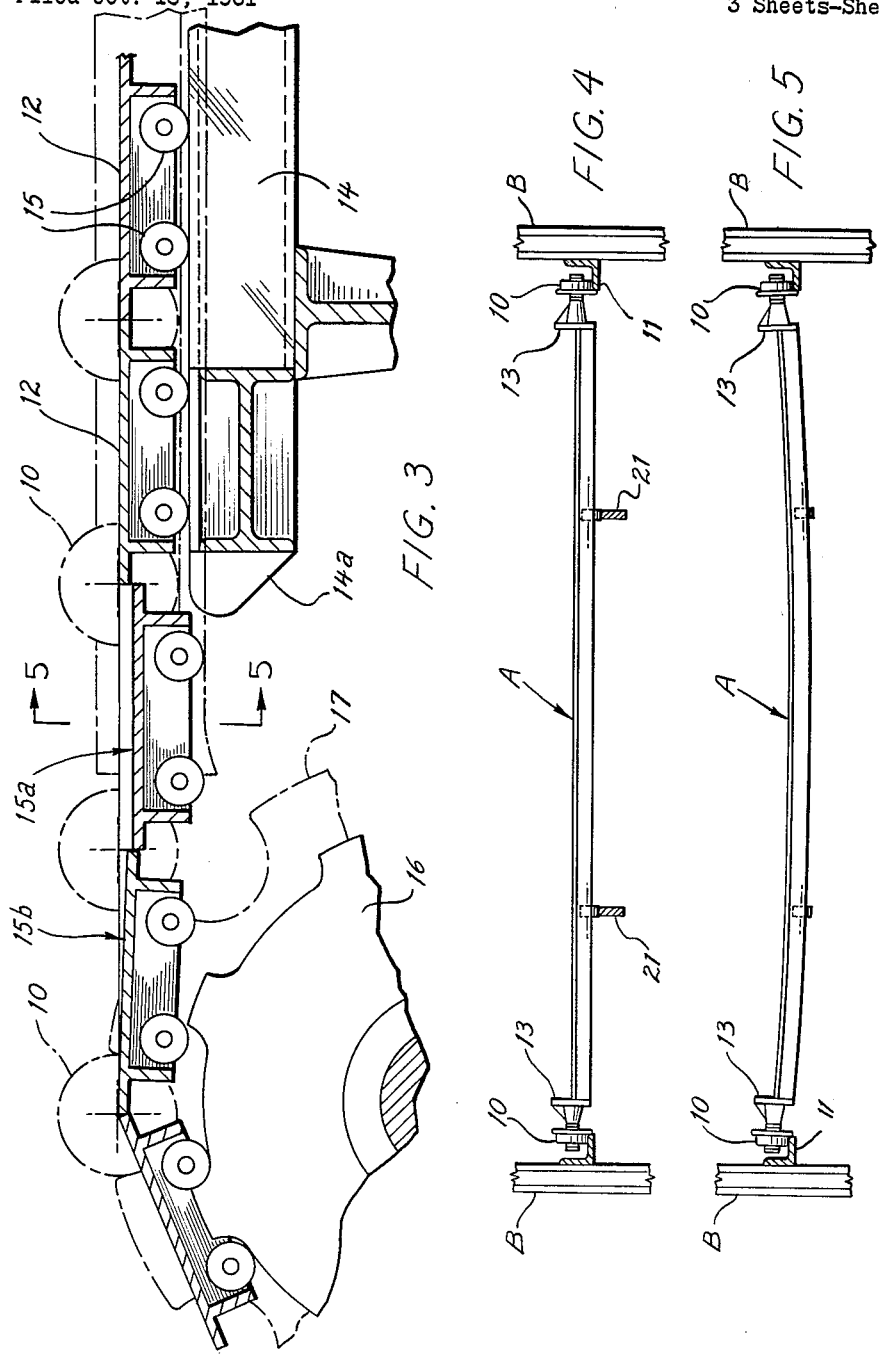

United States Patent Office
3,155,227
Patented Nov. 3, 1964

3,155,227
STABILIZING MEANS FOR ENDLESS CONVEYORS
Joseph P. Wesson, Bury St. Edmund's, England, assignor to Dominion Malting (Ontario) Limited, Toronto, Ontario, Canada, a corporation of Canada
Filed Oct. 18, 1961, Ser. No. 145,813
Claims priority, application Great Britain, Oct. 19, 1960, 35,849/60
2 Claims. (Cl. 198—195)

This invention relates to stabilizing means for endless conveyors employing a series of individual contiguous horizontally arranged plates designed to form a supporting base for granular material to be transported thereby. The invention may conveniently be described in relation to malting of grain but is obviously not confined thereto.

In a continuous process for the malting of grain, the grain is adapted to be continuously fed through various treatment stages of the process on an endless conveyor or conveyors made from light metal, such as aluminum, stainless steel, or other non-corrodible material, and composed of a plurality of continguously arranged foraminous metal plates. By reason of the character of the plates, it is necessary to support them against sagging under load and to maintain contiguous relationship therebetween up to the point of discharge of the grain as to avoid granular material entering between the plates prior to the point of discharge and to prevent distortion of the plates which might lead to consequent damage to the conveyor and its malfunction. The present invention provides a means for maintaining the plates in contiguous and horizontal planar relation as to provide against sagging and distortion thereof up to the point of discharge of the load.

The invention generally embodies stabilizing means for the conveyor plates which are linked to form the sprocket driven load carrying base of the conveyor including supporting means intermediate the ends of said plates for supporting the load carrying base substantially throughout the length of the conveyor as to maintain said plates in horizontal planar arrangement, and operative means extending between the terminal end of said supporting means and the driving sprocket of the conveyor for maintaining the horizontal planar and contiguous relationship of the plates up to the point for discharge of the carried material and displacement of each plate from normal load supporting position as caused by its travel around the sprocket.

The invention will be clearly understood by reference to the following detailed specification taken in conjunction with the accompanying drawings.

In the drawings:

FIG. 2 is a similar view to FIG. 1 illustrating the support of the conveyor plates adjacent the sprocket when the sprocket is in a more advanced position than that shown in FIG. 1.

FIG. 3 is a view somewhat similar to FIGS. 1 and 2 but illustrating the distortion of the conveyor plates when they are located adjacent to the sprocket and not supported in this location.

FIG. 4 is a schematic, partly sectional view of the upper load supporting base of the conveyor to illustrate the approximate location of the supporting means of FIGS. 1 and 2 in relation to the overall length of each plate.

FIG. 4a is a partial top view of FIG. 4.

FIG. 5 is a view similar to FIG. 4 but illustrating sagging or distortion of the conveyor plates when unsupported intermediate their lengths.

Figure 1:
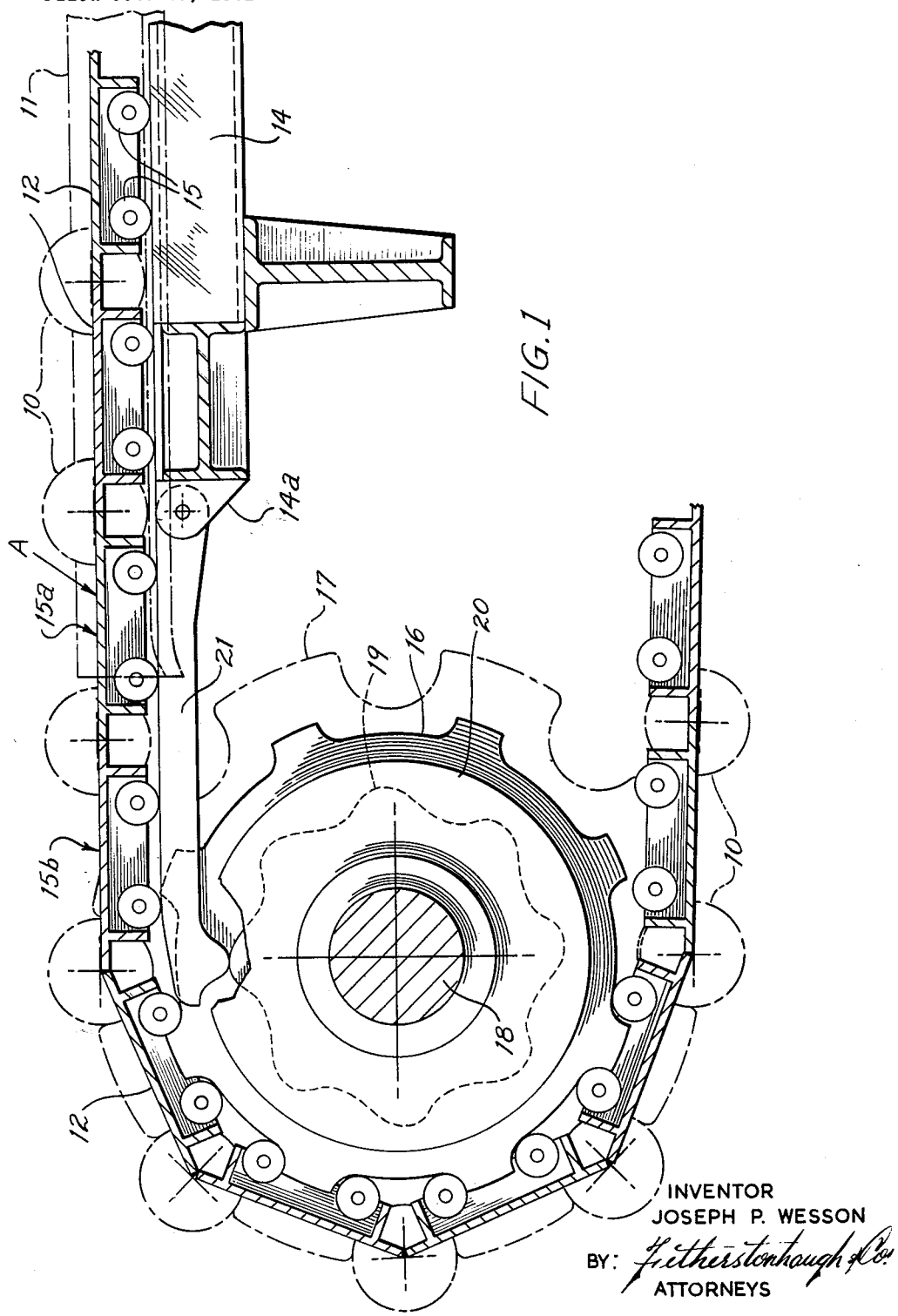
FIG. 1 is an enlarged fragmentary partly sectional view of an endless conveyor adjacent to the load discharging end thereof, constructed in accordance with the present invention illustrating the support of the conveyor plates adjacent to a sprocket of the conveyor.

Referring to the drawings, A indicates a conveyor belt supported by rollers 10 (FIG. 4) on suitable supporting tracks 11 carried by a framework B adapted to provide an enclosed housing for the conveyor. The conveyor A is made up of a plurality of preferably foraminous metal plates 12 extending transversely across the housing, which plates are made up of thin non-corrodible metal such as aluminum, stainless steel, etc. and which are supported by means of end elements 13 (FIG. 4) operatively connected to the rollers 10, the said rollers being adapted to be interconnected by links as to form a driving chain for the conveyor. The links of the conveyor chain are of such length as to dispose the plates 12 in side by side contiguous relationship as to provide a travelling supporting base for granular material to be transported by said conveyor. Due to the fact that the plates are of relatively thin metal and require to support a substantial load, the plates are supported intermediate their lengths substantially throughout the length of the conveyor by means of longitudinally extending supporting tracks 14 adapted to be engaged by a pair of rollers 15 aligned with each other transversely of each plate and preferably located at two points intermediate along the length of each plate. This, therefore, assures that substantially throughout the length of the conveyor the plates will be maintained in horizontal planar and contiguous relationship. However, this intermediate supporting means must necessarily terminate at a point short of guide sprockets 16 adapted to guide the rollers 15 in a path circling the drive shaft of the conveyor hereinafter referred to. Thus, the supporting means 14 has a terminal end 14a spaced from the guide sprocket 16 and thus would leave the conveyor plates unsupported between terminal end 14a of the support means 14 and the guide sprocket 16. If left unsupported, the condition arises as shown in FIG. 3 wherein the conveyor plates, designated as 15a and 15b, would under load sag intermediate their length, thus not only disturbing the continguous horizontal planar relationship of the plate 15a and 15b in relation to the adjacent supported plates as to permit granular material to enter between the disposed edges but also subject the plates to distortion and strain which would ultimately cause malfunction of the conveyor. Accordingly, the salient feature of the present invention is the support of plates located in positions 15a and 15b (FIG. 3) between a guide sprocket 16 and the terminal end 14a of the supporting track 14.

The conveyor is adapted to be driven by the drive sprockets 17 disposed adjacent each end of the drive shaft 18 so that the sprockets will engage between the rollers 10 which, as above indicated, are designed to be link connected to form the drive chain of the conveyor and located to ride on the tracks 11 as shown in FIG. 4. The guide sprockets 16 are located on the drive shaft 18 preferably in a location adjacent to the location of the rollers 15, as shown in FIG. 4, so that the teeth thereof may enter between the rollers 15 to guide the plates in their movement when they circle the drive shaft 18. Preferably connected to each guide sprocket 16 to rotate therewith is a cam 19 forming an undulating cam track disposed between each sprocket 16 and a disc 20 spaced apart from each guide sprocket 16. This cam is adapted to engage the free end of a cam followers arm 21 having its opposite end pivotally mounted directly adjacent to the terminal end 14a of support means 14 and preferably pivotally connected to such end. Consequently, each such arm 21 is adapted to engage the rollers 15 of the plates 12 when such plates reach the position indicated by 15a and 15b and the undulating character of the track of cam 19 is correlated to the teeth of guide sprockets 16 and the driving sprockets 17 such that the arm 21 will be positioned always to engage rollers 15 of plates 12 when located in positions 15a and 15b, i.e. between the terminal end 14a of supporting track 14 and the top dead centre position of the space between two teeth of guide sprockets 16 as to maintain the plates 12 in horizontal coplanar relationship with the following plates forming the load supporting base. In this respect the rises on cams 19 register with the spaces between sprocket teeth and each plate positioned at 15b is supported in horizontal position until a roller thereof is engaged and supported by the said guide sprockets. Accordingly, the granular load carried by the conveyor is efficiently carried from the receiving end of the conveyor to the discharge end and is efficiently discharged by the conveyor at the point where the conveyor plates commence to swing in their normal travel to circle around the drive shaft 18. It will be obvious, of course, that the thickness of the cams 19 and the guide sprockets 16 is correlated to the length of the rollers 15 so that, on the one hand, the sprocket guide teeth will enter between rollers 15 and, on the other hand, the follower arms 21 of similar thickness to the cams 19 will also engage the rollers 15 and thus perform the required supporting function thereof.

What I claim as my invention is:

1. An endless conveyor comprising: a load carrying base having substantially contiguous horizontally arranged and interlinked plates, a sprocket for driving said base, stablizing means including supporting means intermediate the ends of the conveyor plates for supporting the load carrying base substantially throughout the length of the conveyor as to maintain said plates in horizontal planar arrangement, and operative means extending between a terminal end of said supporting means and the driving sprocket of the conveyor for maintaining substantially horizontal planar and contiguous relationship of the plates up to the point of travel where each plate is displaced from normal horizontal load supporting position caused by its travel around the sprocket, said operative means comprising an arm, pivotally mounted at one end adjacent to said terminal end of said conveyor supporting means and extending toward said sprocket, a cam carried on the sprocket drive shaft engageable by the opposite and free end of said arm, said arm having said opposite free end located to engage said cam and being movable thereby to support said plates.

2. Stabilizing means as claimed in claim 1, in which guide sprockets are carried by said shaft and rollers are carried by said plates engageable with said conveyor supporting means and engageable with said guide sprockets, said cam having cam rises located to register radially with each space between the teeth of said sprockets as to raise said arm into engagement with rollers of said plates and maintaining the plate, currently positioned to be engaged by said guide sprockets, horizontal and supported until a roller thereof is engaged and supported by said sprockets.

References Cited by the Examiner
UNITED STATES PATENTS

| 1,586,382 | 5/26 | Reed | 198—195 |
| 1,724,908 | 8/29 | Comstock | 198—195 |
| 2,303,587 | 12/42 | Snyder | 198—195 |
| 2,868,352 | 1/59 | Harrison | 198—137 |

SAMUEL F. COLEMAN, *Acting Primary Examiner.*

JULIUS E. WEST, ERNEST A. FALLER, JR.,
*Examiners.*